T. B. WALKER.
PROCESS OF AND APPARATUS FOR HYDROGENATING FATS, OILS, WAXES, AND THE LIKE.
APPLICATION FILED JAN. 6, 1917.
1,276,290. Patented Aug. 20, 1918.
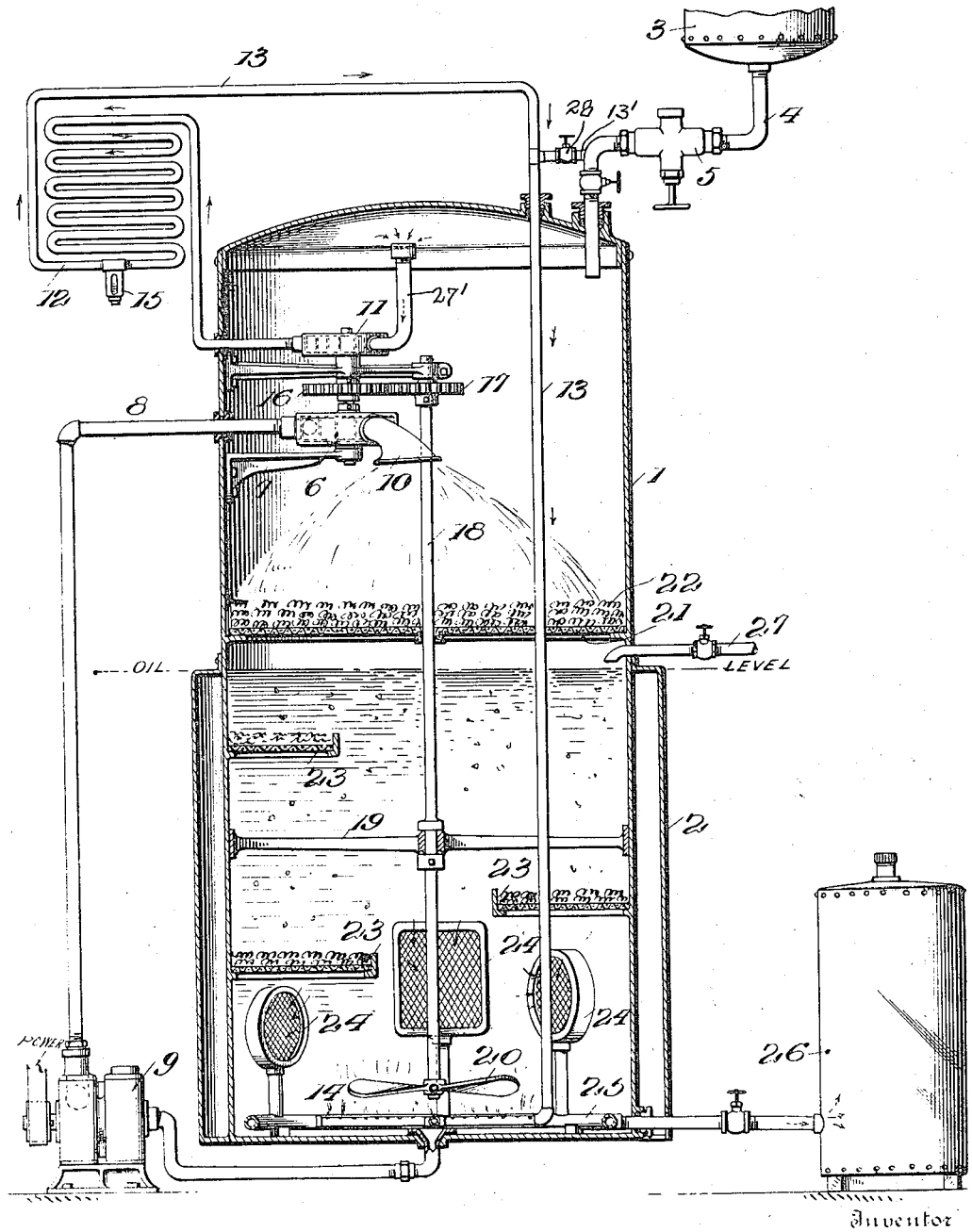

UNITED STATES PATENT OFFICE.

THOMAS BAILEY WALKER, OF AUSTIN, TEXAS.

PROCESS OF AND APPARATUS FOR HYDROGENATING FATS, OILS, WAXES, AND THE LIKE.

1,276,290.         Specification of Letters Patent.    Patented Aug. 20, 1918.

Application filed January 6, 1917. Serial No. 141,061.

*To all whom it may concern:*

Be it known that I, THOMAS BAILEY WALKER, a citizen of the United States of America, and a resident of Austin, Texas, have invented a new and useful Improvement in Processes of and Apparatus for Hydrogenating Fats, Oils, Waxes, and the like, which invention is fully set forth in the following specification.

This invention relates to improvements in processes of and apparatus for hydrogenating fats, oils, waxes and the like, and has for its objects to produce a higher grade product requiring no after treatment or purification, to reduce manufacturing costs by cutting down the duration of the reaction, reducing the losses of hydrogen to a minimum and prolonging the life of the catalytic agent.

With a view of attaining these objects, my invention resides in providing a process of treating the bodies referred to and in apparatus for carrying out the process.

My process, generally stated, consists in subjecting the fats, oils, or waxes or like substances to the action of one or more catalytic agents in the presence of hydrogen at hydrogenating temperatures, and, during the operation, withdrawing from the hydrogenator the hydrogen associated with moisture of reaction, together with any suspended by-products, purifying the gas thus removed by aid of a condenser with or without chemical treatment, and returning the purified gas to the hydrogenator with or without the addition of a fresh supply of hydrogen. While my process may be carried out in a variety of apparatus, I prefer to employ my improved apparatus as herein described and claimed. For this purpose, I provide a receptacle having connection with a supply of hydrogen. Within the receptacle is supported a bed of coarse catalytic material above the body of oil or fat in which is suspended finely divided catalytic material, and preferably on shelves below this bed other masses of coarse catalytic material are placed. In the space above the bed, I locate a fluid-driven motor which is geared to a shaft for running a fan located near the gas inlet for breaking up gas bubbles, and also drives a hydrogen pump located within the receptacle. Outside the receptacle I provide a system of conduits, in one of which is located a pump adapted to force the oil or liquid under treatment from the bottom of the receptacle to the oil motor inside thereof, which latter delivers the oil in a spray above the body of catalytic material. Another conduit of the system includes a condensing apparatus such as a condensing-worm with a trap, and the hydrogen pump which circulates hydrogen with its admixture of moisture and other products resulting from reaction on the oils through the condenser and returns it to the bottom of the receptacle to pass up through the oil. I preferably provide a connection with this hydrogen conduit for introducing fresh hydrogen when desired.

By aid of this apparatus I am enabled to continually remove moisture and other volatile reaction products from the sphere of reaction and thereby facilitate the process of hydrogenation while reducing to a minimum the formation of catalytic soaps. The location of the hydrogen pump within the receptacle and driving the same by the current of oil under treatment effects a material saving in hydrogen by preventing leaks, and also economizes power otherwise used in stirring the materials treated. The above and other features will be more fully explained in the detailed description.

In order that the invention may be more readily understood, reference is had to the accompanying drawings which illustrate one mechanical embodiment of the inventive idea and which are intended to assist the description of the invention but not as defining the limits thereof.

Referring to the drawing, 1 is a hydrogenizing tank provided with a heating jacket 2 at the lower portion thereof. 3 is a storage tank for hydrogen under pressure connected with the tank 1 through a conduit 4 provided with a reducer valve 5. Located within the tank is a fluid motor 6 supported by a bracket 7 on the interior wall of the tank. The inlet of this motor is connected by a pipe 8 through a power-driven pump 9 to the bottom of the tank 1. The motor is provided at its delivery end with a spray-nozzle 10. To the driving shaft of this motor is connected a suction fan or gas pump 11 also located within the tank and connected on the exterior with a condensing coil 12, which latter has its delivery end connected with a pipe 13 leading to the bottom of the tank and delivering gas through perforated coils 14. The condenser 12 is preferably provided with a liquid trap 15 for separating condensed liquid from the gas. Also mounted on the drive shaft of the motor 6 is a gear 16 meshing with a companion gear 17 mounted upon a fan shaft 18 supported by a suitable bracket 19. At the bottom of this shaft is made fast a fan 20 which rotates in the path of the ascending bubbles of gas whereby it breaks up said bubbles. Below the spray-nozzle 10 is located a screen 21 adapted to support coarsely divided catalytic material 22, preferably in the form of shavings. Supplementing this bed of material are other portions of catalytic material supported on small screens 23 extending interiorly from the walls of the tank. Just above the bottom of the tank is located a plurality of screened outlets 24 surrounding the fan 20. These screened outlets connect through a circular pipe 25 with a receiving tank 26 in which a vacuum is maintained for the purpose of withdrawing the liquid from the tank. Hydrogen may be, and preferably is, supplied to pipe 13 by means of a valved connection 13' and a valve 28. 27' is a gas filter.

The apparatus thus described operates in the following manner:—

The oil or fatty material in liquid form, mingled with a suitable quantity of finely divided catalytic material, is introduced into the tank through a supply conduit 27, a suitable quantity of coarse catalytic material having been placed upon the screens 21 and 23. Hydrogen from the storage tank is admitted to the tank through reducer valve 5. The contents of the receptacle are heated to a reacting temperature by introducing heating fluid into the jacket 2. The power-driven pump 9 is started, thereby drawing oil from the bottom of the tank and delivering it to motor 6 from which it is delivered in a spray to the atmosphere of hydrogen, dropping onto the coarse catalytic material 22 through which it percolates back to the body of oil.

The gas pump 11 also starts and draws the hydrogen, now contaminated with moisture and vaporizable reaction products, and passes it through condenser 12 wherein all liquefiable portions are condensed and drawn off through pipe 15, while the gas thus purified passes through pipe 13 to be bubbled up through the oil through perforated pipes 14. The motor 6 also sets into operation fan 20 through drive shaft 18 and gears 16 and 17, and thereby enables the fan located within the body of oil and below the atmosphere of hydrogen above the oil to break up the bubbles as they are formed, greatly increasing the surface of contact of gas and catalytic material for acting on the oil, and also diminishing the chances of formation of gas channels in the liquid.

When the operation of hydrogenization is completed, the hydrogenated product is withdrawn through the screened delivery openings 24 and delivered into the tank 26 under reduced pressure. During this withdrawal, the fan also performs the function of keeping the screens free from solid particles which might otherwise deposit thereon and clog the discharge openings. In order to avoid the corroding action to which these screens are subjected, I prefer to use screens made of "monel" metal well known as possessing anti-corrosive properties.

What is claimed is:—

1. Apparatus for hydrogenizing oils, fats and the like, comprising a closed receptacle adapted to be connected with a source of hydrogen, means for supporting catalytic material therein, a fluid-operated motor and a gas circulating pump driven thereby both located in said receptacle, a conduit including a power-driven pump for delivering oil from the said receptacle through said motor for driving said gas pump, and means for spraying the oil discharged from the first-named motor over said catalytic material and a conduit including said gas pump for withdrawing gas from above the surface of liquid in the receptacle and discharging the same into the liquid.

2. Apparatus for hydrogenizing oils, fats, and the like, comprising a receptacle adapted to be connected with a source of hydrogen and provided with means for supporting catalytic material therein, a fluid-operated motor and a gas pump driven thereby both located within said receptacle, a gas-circulating conduit connected with said gas pump including a condenser outside said receptacle, a second conduit including a power-driven pump for delivering oil from the receptacle through said motor to said catalytic material.

3. Apparatus for hydrogenizing oils, fats and the like, comprising a receptacle adapted to be connected with a source of hydrogen, means for supporting catalytic material therein, a fluid-operated motor having a spray delivery nozzle, a gas pump and a fan shaft driven by said motor and each within the receptacle, and a conduit including a power-driven pump adapted to withdraw oil under treatment in the receptacle and force the same through said motor, and a second conduit including said gas pump for withdrawing gas from above the surface of the liquid in said receptacle and discharging the same into said liquid.

4. Apparatus for hydrogenizing oils, fats, and the like, comprising a receptacle adapted to be connected with a source of hydrogen, means for supporting catalytic material therein, liquid discharge outlets provided with screens, a liquid-circulating device in front of said screens, and a fluid motor within said receptacle operably connected to said circulating device and a power-driven pump delivering oil under treatment through said motor to said catalytic material.

5. Apparatus for hydrogenizing oils, fats and the like, comprising a closed receptacle adapted to be connected with a source of hydrogen, a catalytic septum dividing said receptacle into upper and lower compartments, a liquid circulating pipe open to both compartments and including a fluid motor located in the upper compartment, and provided with a spraying device, a power driven pump for forcing liquid through said pipe, a gas circulating pipe open to both compartments and including a gas pump having driving connections with said motor.

6. Apparatus for hydrogenizing oils, fats, and the like, comprising a closed receptacle adapted to be connected with a source of hydrogen, a catalytic septum dividing said receptacle into an upper compartment and a lower compartment provided with trays adapted to support catalytic material, a liquid circulating pipe open to both compartments including a power driven pump, a fluid motor in the upper compartment connected to said pipe and provided with a spray delivery, a gas circulating pipe open to both compartments and including liquid separating means and a gas circulating pump having driving connections with said motor, and stirring means in the lower compartment having operating connections with said motor.

7. The process of hydrogenizing oils, fats, and the like, consisting in subjecting a body of the oily liquid in which catalytic material is suspended to the action of hydrogen, conducting the hydrogen escaping therefrom through a body of catalytic material, and simultaneously spraying onto said material a portion of the oil previously treated and permitting the same to percolate through said material into the main body of oil.

8. The process of hydrogenating fats, oils, waxes and the like, consisting in subjecting the liquefied material to be hydrogenated in the presence of a finely divided catalyzer and a body of coarse catalyzer to the action of hydrogen in the presence of heat, withdrawing portions of the liquid, and returning the same in spray above the body of coarse catalyzer and in the presence of the hydrogen and repeating the cycle.

In testimony whereof I have signed this specification.

THOMAS BAILEY WALKER.